(12) United States Patent
Kim et al.

(10) Patent No.: US 8,463,976 B2
(45) Date of Patent: Jun. 11, 2013

(54) DUAL MODEM DEVICE AND CONTROLLING METHOD THEREOF

(75) Inventors: Young Kim, Daejeon (KR); Chang Hwan Lee, Anyang-si (KR); Young Hwan Lee, Seongnam-si (KR); Chang Jae Lee, Cheonan-si (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 12/788,108

(22) Filed: May 26, 2010

(65) Prior Publication Data

US 2010/0325335 A1 Dec. 23, 2010

Related U.S. Application Data

(60) Provisional application No. 61/219,394, filed on Jun. 23, 2009.

(51) Int. Cl.
- *G06F 13/00* (2006.01)
- *H04B 1/38* (2006.01)
- *H04L 5/16* (2006.01)

(52) U.S. Cl.
USPC .......................................... 710/316; 375/222

(58) Field of Classification Search
USPC .......................................... 710/316; 375/222
See application file for complete search history.

(56) References Cited

U.S. PATENT DOCUMENTS

| | | | |
|---|---|---|---|
| 6,081,850 A | 6/2000 | Garney | |
| 7,849,260 B2 * | 12/2010 | Okuno et al. | 711/113 |
| 7,957,411 B2 * | 6/2011 | Gonikberg et al. | 370/462 |
| 8,135,945 B2 * | 3/2012 | Gehrmann | 713/2 |
| 2004/0255058 A1 | 12/2004 | Baker et al. | |
| 2006/0200573 A1 * | 9/2006 | Lin | 709/231 |
| 2006/0268174 A1 * | 11/2006 | Obara et al. | 348/571 |
| 2007/0032100 A1 * | 2/2007 | Yang et al. | 439/43 |
| 2007/0130614 A1 * | 6/2007 | Han et al. | 725/152 |
| 2008/0039007 A1 * | 2/2008 | Wu et al. | 455/3.01 |

(Continued)

FOREIGN PATENT DOCUMENTS

| | | |
|---|---|---|
| EP | 2254252 A2 * | 11/2010 |
| JP | 2003298762 | 10/2003 |

(Continued)

OTHER PUBLICATIONS

Mohamed, N.I.; Rahman, T.A.; Leow, C.Y.; , "Issues and challenges of LTE antenna designs for USB-dongle device," Antennas and Propagation in Wireless Communications (APWC), 2012 IEEE-APS Topical Conference on , pp. 43-46, Sep. 2-7, 2012.*

(Continued)

*Primary Examiner* — Faisal M Zaman
(74) *Attorney, Agent, or Firm* — KED & Associates, LLP

(57) ABSTRACT

A dual modem device includes a first processor to communicate with a first network and a second processor to communicate with a second network. The first processor includes a USB module to transceive a signal with a computer side using a universal serial bus (USB) interface, a first packet control block to determine a type of the signal transceived via the USB module and to decide a communication path, and a first function block to process a signal associated with the first network. The second processor includes a first control block to process a control signal for the first processor, a second control block to process a control signal for the second processor, and a second function block to process a signal associated with the second network.

16 Claims, 8 Drawing Sheets

U.S. PATENT DOCUMENTS

| | | | |
|---|---|---|---|
| 2008/0081663 A1* | 4/2008 | Kasslin et al. | 455/557 |
| 2008/0140856 A1* | 6/2008 | Holt | 709/232 |
| 2009/0005048 A1* | 1/2009 | Bae et al. | 455/439 |
| 2009/0006703 A1 | 1/2009 | Fa et al. | |
| 2009/0068969 A1* | 3/2009 | Lindoff et al. | 455/161.1 |
| 2009/0100279 A1* | 4/2009 | Lee | 713/320 |
| 2009/0172759 A1* | 7/2009 | Jung | 725/111 |
| 2009/0190638 A1* | 7/2009 | Meir et al. | 375/222 |
| 2009/0245334 A1* | 10/2009 | Chaudhuri et al. | 375/222 |
| 2009/0305737 A1* | 12/2009 | Bae et al. | 455/552.1 |
| 2010/0070652 A1* | 3/2010 | Maciocco et al. | 709/248 |
| 2010/0227591 A1* | 9/2010 | Park et al. | 455/411 |
| 2010/0228902 A1* | 9/2010 | Chou et al. | 710/306 |
| 2011/0003602 A1* | 1/2011 | Kim et al. | 455/456.1 |
| 2011/0086621 A1* | 4/2011 | Son et al. | 455/414.1 |
| 2011/0110256 A1* | 5/2011 | Han et al. | 370/252 |
| 2011/0110332 A1* | 5/2011 | Kim et al. | 370/331 |
| 2011/0145445 A1* | 6/2011 | Malamant et al. | 710/16 |
| 2011/0145514 A1* | 6/2011 | Lee et al. | 711/147 |
| 2011/0185394 A1* | 7/2011 | Rakib | 725/111 |
| 2012/0120993 A1* | 5/2012 | Lin et al. | 375/222 |
| 2012/0148231 A1* | 6/2012 | Farley et al. | 398/22 |
| 2012/0249338 A1* | 10/2012 | Merino | 340/854.6 |

FOREIGN PATENT DOCUMENTS

| | | |
|---|---|---|
| JP | 2005117652 | 4/2005 |
| JP | 2011015437 A * | 1/2011 |
| JP | 2011176540 A * | 9/2011 |
| JP | 2011254384 A * | 12/2011 |
| JP | 2012175539 A * | 9/2012 |
| WO | WO 98/14881 | 4/1998 |
| WO | WO 02/09405 | 1/2002 |
| WO | WO 2007/108596 | 9/2007 |
| WO | WO 2007128235 A1 * | 11/2007 |
| WO | WO 2008143459 A1 * | 11/2008 |

OTHER PUBLICATIONS

Byeongkwan Kim; Yongsoo Park; Hyunho Wi; Myun-Joo Park; Yonggyu Choi; Jeongkwan Lee; Woojae Jung; Daewoong Kim; Byungje Lee; , "Isolation Enhancement of USB Dongle MIMO Antenna in LTE 700 Band Applications," Antennas and Wireless Propagation Letters, IEEE , vol. 11, pp. 961-964, 2012.*

Wenhui Xiong; Matolak, D.W.; , "Spectrally shaped generalized MC-DS-CDMA with dual band combining for increased diversity," Wireless Communications, IEEE Transactions on , vol. 7, No. 5, pp. 1676-1686, May 2008.*

Gye Su Kim; Yeong Ho Je; Suki Kim; , "An adjustable power management for optimal power saving in LTE terminal baseband modem," Consumer Electronics, IEEE Transactions on , vol. 55, No. 4, pp. 1847-1853, Nov. 2009.*

European Search Report dated Oct. 22, 2010.

* cited by examiner

DUAL MODEM DEVICE AND CONTROLLING METHOD THEREOF

CROSS-REFERENCE TO RELATED APPLICATIONS

This application claims benefit of U.S. Provisional Patent Application No. 61/219,394, filed on Jun. 23, 2009, the contents of which incorporated herein by reference.

BACKGROUND

1. Field

One or more embodiments herein relate to signal communications.

2. Background

As mobile networks evolve, greater numbers of communication technologies are being employed. Currently, mobile terminals are being developed for what are considered to be next-generation technology, while older terminals only support previous-generation technology. Both types of terminals, therefore, are limited in terms of their functionality and usefulness.

DETAILED DESCRIPTION

Figure 1:
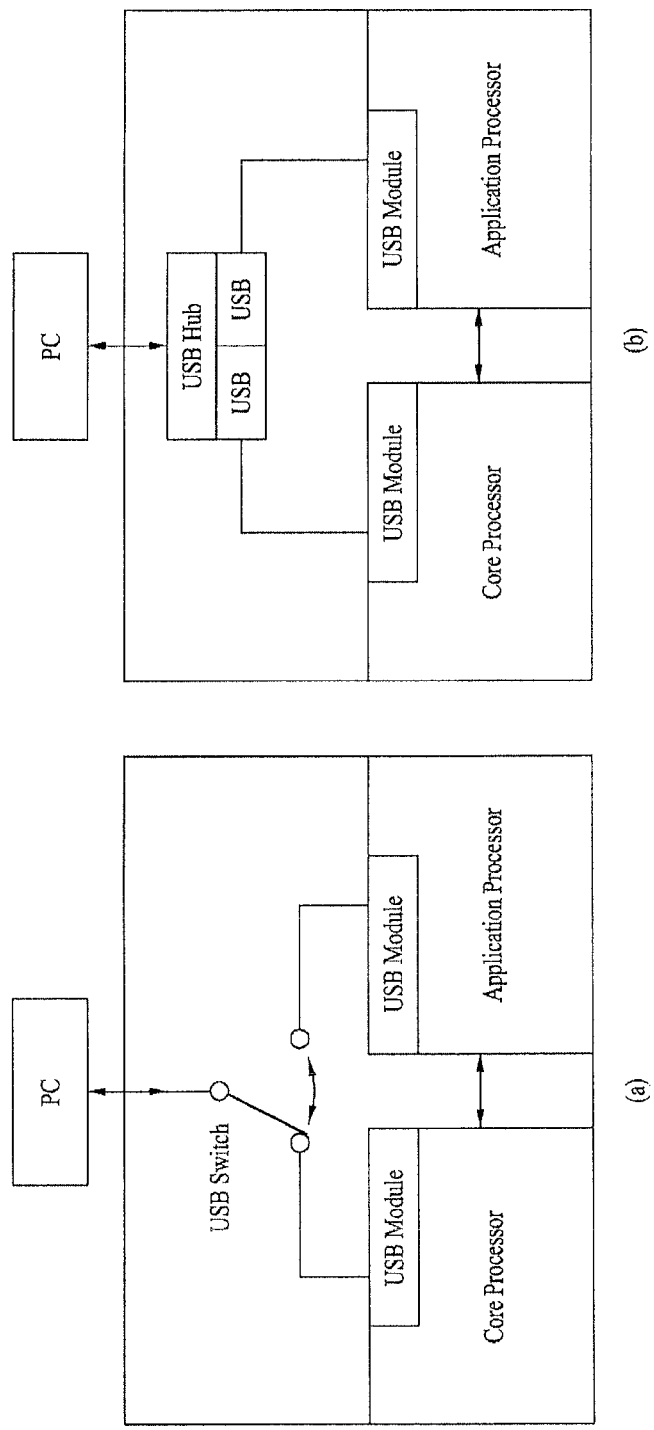
FIGS. 1(a) and 1(b) are diagrams showing different configurations of a dual processor terminal.

FIGS. 1(a) and 1(b) show different configurations of a mobile terminal having dual processors. Both configurations use two USB modules for transceiving data with a PC. One module is included in a core processor and the other is included in an application processor. The terminals differ in respect to how the signals are sent. In FIG. 1(a), the data signals are sent through a USB switch, while in FIG. 1(b) the signals are sent through a USB hub. The data may be classified as communication data or application data depending on the processor to or from which the data is sent.

Figure 2:
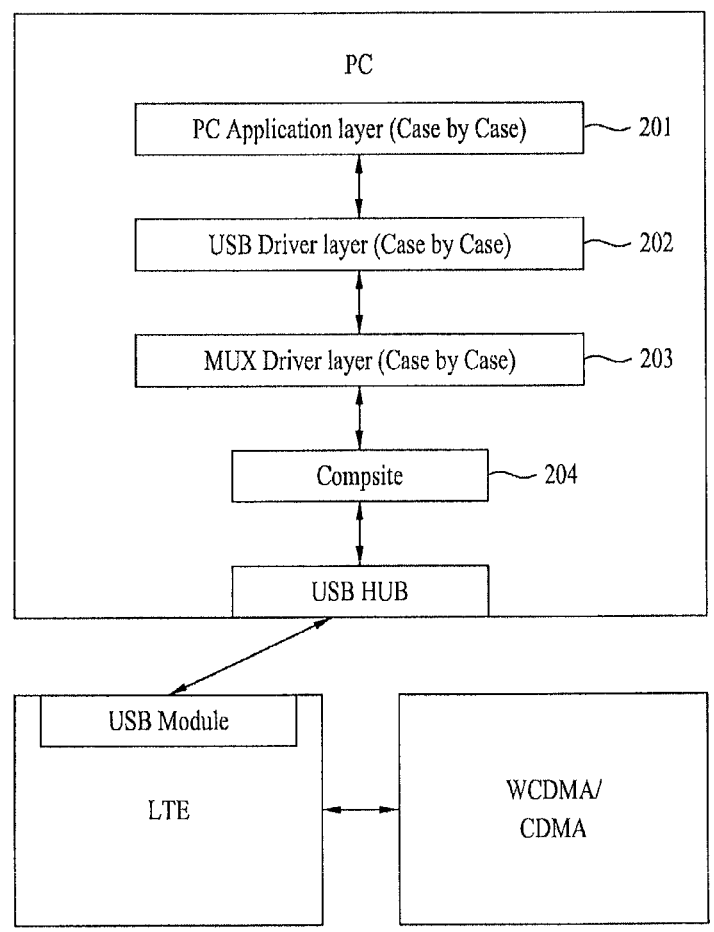
FIG. 2 is a diagram showing one embodiment of a personal computer (PC) system and a dual modem device.

FIG. 2 shows one embodiment of a personal computer (PC) system and a dual modem device. The PC system (or side) includes an application layer 201, a USB bus driver layer 202, a multiplexing/demultiplexing driver layer 203, and a composite 204.

The application layer controls applications supported by the dual modem device and may include, for example, applications needed by a user or provided by a developer. The application layer may be added, removed, modified, or configured as necessary at the time of developing the device.

The USB bus driver layer may include a USB driver for one or more of the applications and may be loaded for corresponding interfaces. According to one arrangement, the USB bus driver layer may include USB drivers that correspond to one or more applications. The drivers may be activated, for example, based on or in response to requests made by the application layer.

The multiplexing/demultiplexing driver layer multiplexes/demultiplexes signals transceived between the PC and a dual processor device, in order to provide required USB interfaces. The dual processor device may include an LTE processor and a WCDMA/CDMA processor as shown.

If the number of mainly requested endpoints is greater than the number of endpoints that can be implemented, or if a signal path between a PC and the dual modem device needs to be simplified, multiplexing/demultiplexing driver layer 203 is provided as necessary. Meanwhile, if the multiplexing/demultiplexing driver layer exists in the PC side, a multiplexing/demultiplexing module may be included in the dual modem device side as well. Thus, a multiplexed signal received from the PC side can be demultiplexed and/or signals can multiplexed and then transmitted to the PC side.

The composite 204 performs a function of enabling one USB device to diverge to various devices in the PC side. For instance, the dual modem device can diverge to a network device, a modem device and a serial port in the PC side.

Figure 3:
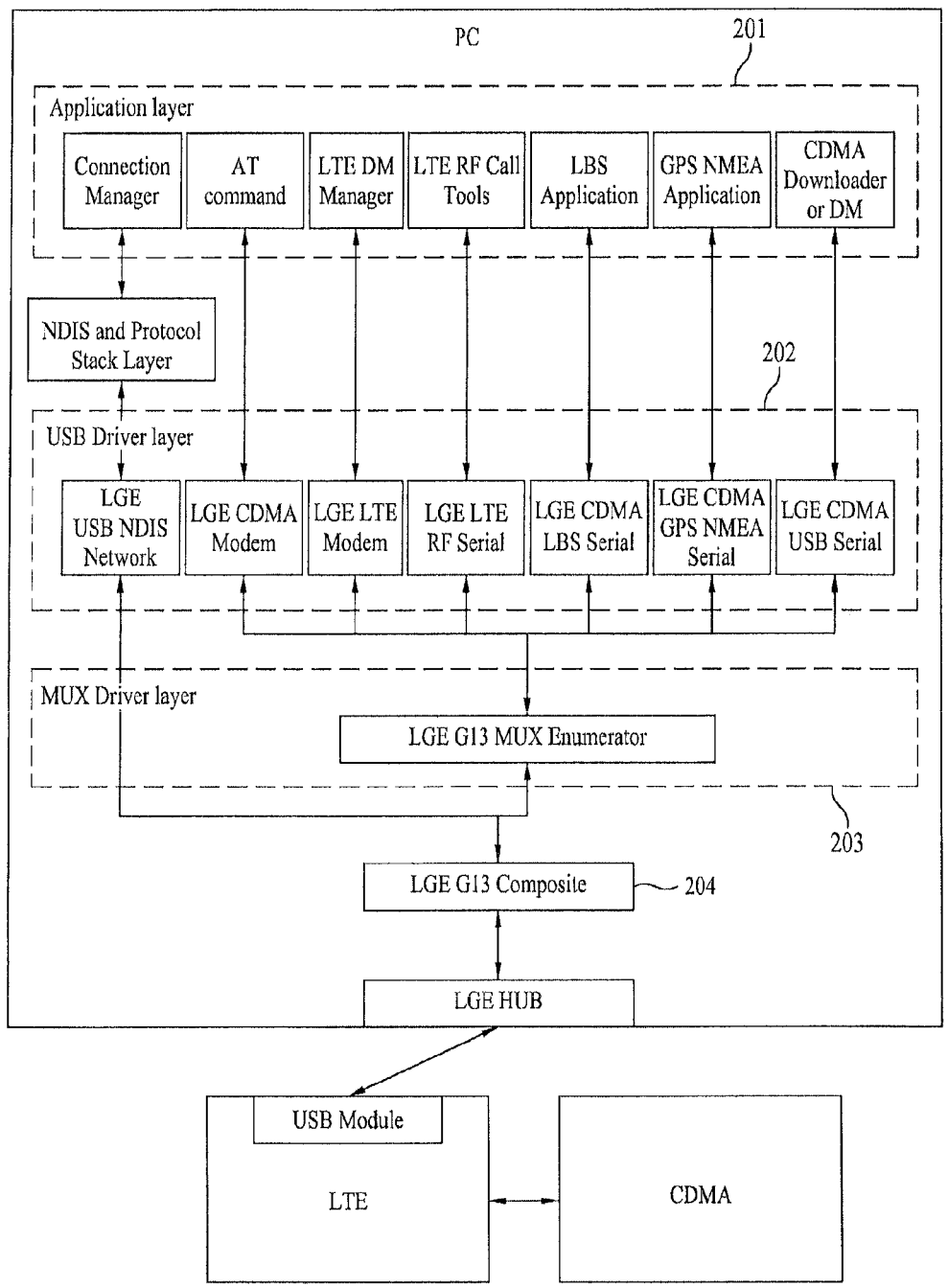
FIG. 3 is a diagram showing another embodiment of a PC system and a dual modem device.

FIG. 3 shows how the layers in the PC side may be configured according to another embodiment. In this embodiment, the applications in application layer 201 may include a CM (control manager) for network control, an AT command for CDMA speech call, an LTE DM (diagnostic monitor) as a diagnostic application of an LTE processor, an LTE RF (radio frequency) call application, an LBS (location based service) application, a GLS (global positioning system) NMEA (national marine electronics association) application, a CDMA downloader, and a CDMA DM. A different arrangement of applications may be used in other embodiments.

The USB bus driver layer 101 may include a USB NDIS 0 network driver, a CDMA modem driver, an LTE modem driver, an LTE RF serial driver, a CDMA LBS serial driver, a CDMA GPS NMEA serial driver, a CDMA USB serial driver and the like for example. The types and number of drivers may vary according, for example, to a USB interface supported by a PC side and a dual modem device side.

In FIG. 3, it may be assumed that the dual modem device supports one network interface and one modem/serial interface. Because one network interface is supported for a final user, network control signals and network data signals do not use a multiplexing/demultiplexing driver layer. However, when two or more network interfaces are supported, a multiplexing/demultiplexing driver layer may be included in FIG. 3 as necessary for network signals.

Moreover, in one embodiment a total of 6 modem/serial interfaces may be supported for the final user. However, in other embodiments, a dual modem device may support greater or fewer numbers or only one modem/serial interface. In the case where only one is used, a multiplexing/demultiplexing driver layer 203 may or may not used.

Figure 4:
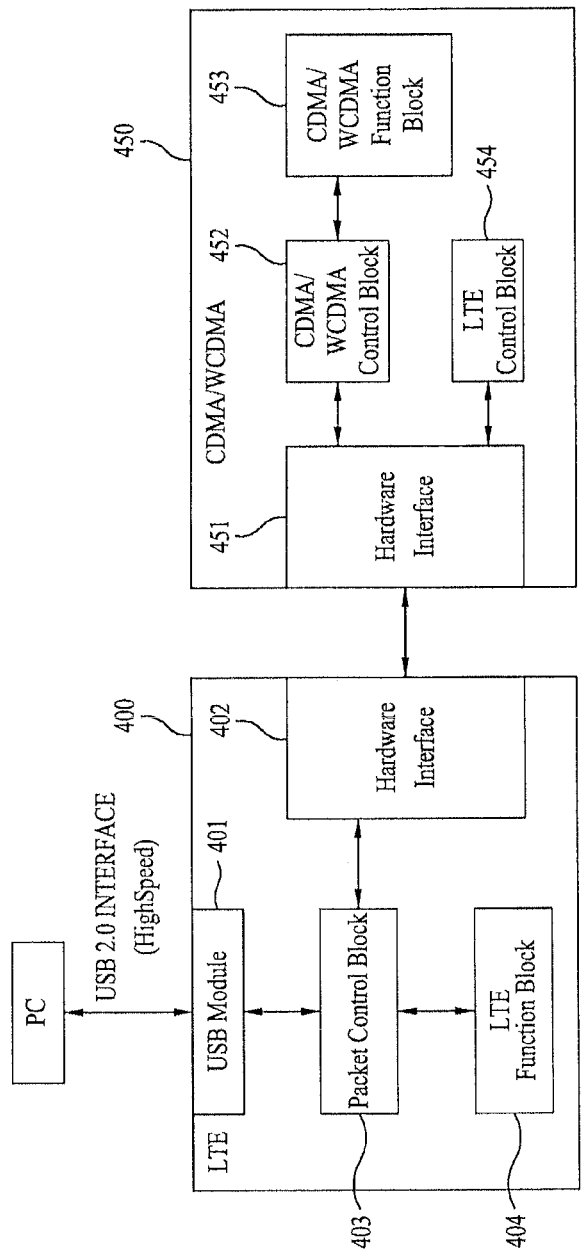
FIG. 4 is a diagram of one configuration of the dual modem device.

FIG. 4 shows one embodiment of a dual modem device that may communicate with a PC system or side. This device includes a USB module 401 of an LTE processor for a USB connection to the PC. The USB module 401 may support some or all of the interfaces supported by a USB of a CDMA/WCDMA processor 450. Even if a USB interface is unnecessary for the LTE processor, it should be implemented to be supportable for the CDMA/WCDMA processor. For this, LTE processor 400 may further include a multiplexing/demultiplexing driver. Moreover, because USB module 401 exists in LTE processor 400 only, the LTE processor may operate as a router for signals to be delivered to the CDMA/WCDMA processor.

Hardware interfaces 402 and 451 responsible for communications between two processors include some or all interfaces connectible for communications among hardware interfaces available between the two processors. The connectible interfaces may include, for example, an SDIO (secure digital input output), UART (universal asynchronous receiver/transmitter), and/or EBI (external bus interface).

The CDMA/WCDMA processor 450 may serve as a host to control the LTE processor 400. If so, an LTE control block 454 and a CDMA/WCDMA control block 452 may be provided in the CDMA/WCDMA processor 450. The LTE processor 400 may serve to control the CDMA/WCDMA processor 450, and the LTE control block 454 and CDMA/WCDMA control block 452 may exist in the LTE processor 400.

A packet control block 403 of the LTE processor 400 may perform a destination selection of a signal received from the PC side. LTE network control signal and CDMA/WCDMA network control signal are delivered to CDMA/WCDMA processor 450 as a host. Other data signals may be delivered to an LTE function block 404 of the LTE processor or a CDMA/WCDMA function block 453 of the CDMA/WCDMA processor by packet control block 403 of the LTE processor according to types and characteristics of the corresponding data signals. For this, the packet control block 403 should provide a frame work unified for all signals.

Meanwhile, the LTE network control signal may come via USB module 401 of the LTE processor and then may be delivered to LTE control block 454 of the CDMA/WCDMA processor 450 via hardware interfaces 402 and 451 from the packet control block 403. The LTE network control signal is delivered again to LTE function block 404 of the LTE processor to control the LTE processor. Moreover, since the LTE has data throughput requirements considerably higher than those of the CDMA/WCDMA, the LTE network data signal is directly delivered to LTE function block 404 via packet control block 403.

The configuration of the PC side shown in FIG. 2 and the configuration of the dual modem device side shown in FIG. 4 may be understood as follows. First, there may be various types of signals transceived via USB communications. Additionally, the transceived signals may be divided into various paths within the CDMA/WCDMA as described in greater detail below.

Assume that interfaces 402 and 451 use SDIO. For clarity, CDMA/WCDMA control block 452 and CDMA/WCDMA function block 453 are represented as one CDMA/WCDMA function and control block. Moreover, HIM corresponds to a sort of protocol that can determine a signal path between the PC side and LTE processor 400 and a signal path between the LTE processor and CDMA/WCDMA processor 450. In other embodiments, protocols different from HIM may be used.

Figure 5:
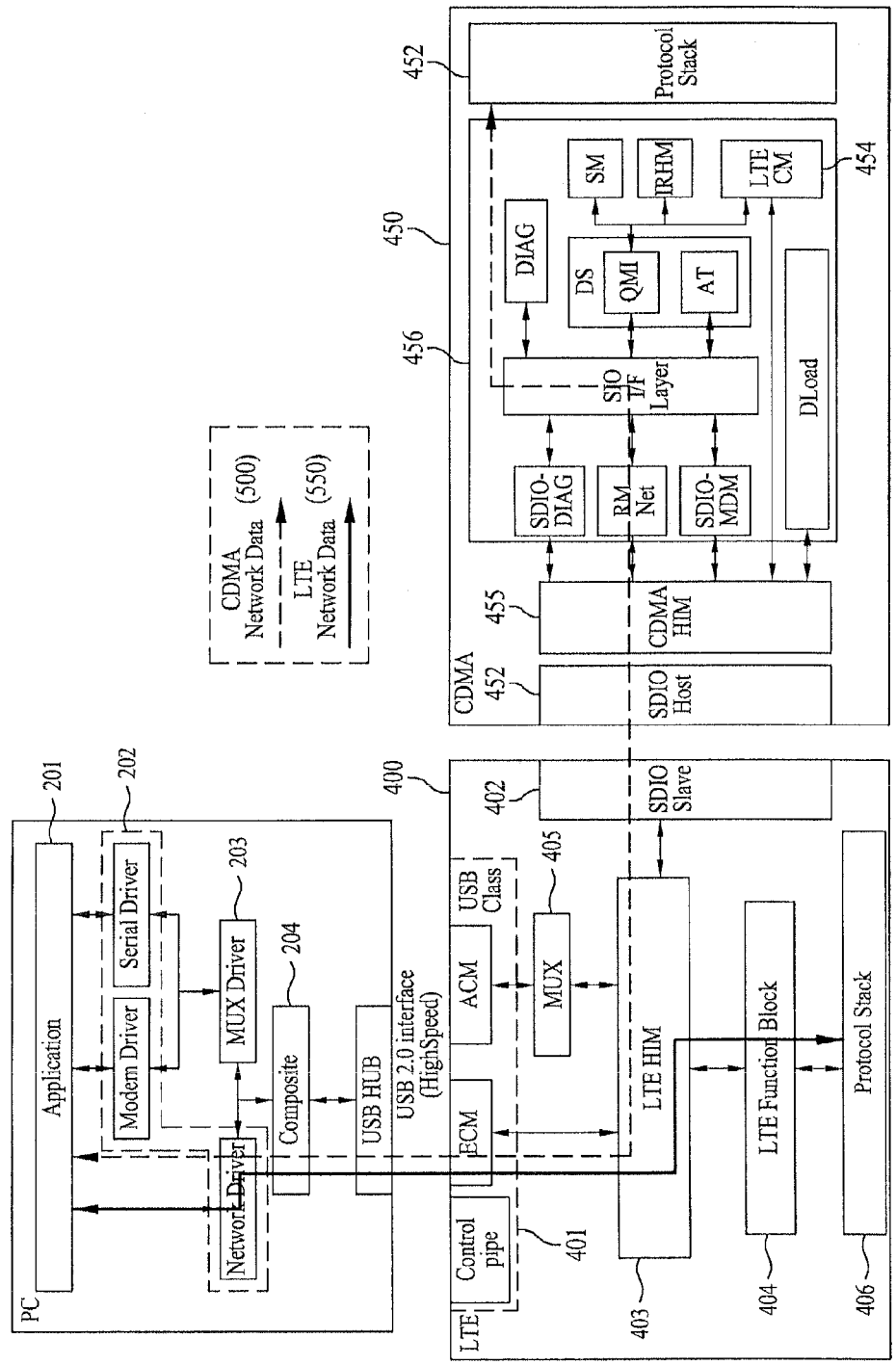
FIG. 5 is a diagram showing communication paths that may be provided for carrying CDMA/WCDMA network data signals and long term evolution (LTE) network data signals between the dual modem device and PC system.

FIG. 5 shows one arrangement of communication paths for carrying CDMA/WCDMA network data signals and LTE network data signals between a dual modem device and a PC. In this arrangement, an LTE HIM (which is a packet control block 403 of the LTE processor) determines a path by determining whether network data is LTE or CDMA data. This determination may be made, for example, according to whether a network currently connected to the dual modem device is an LTE network or a CDMA network.

Hence, in a path 500 of CDMA/WCDMA network data signal, a USB module of the LTE processor communicates with a PC side in the first place. The LTE HIM 403 converts the CDMA/WCDMA network data signal to a HIM packet and then delivers it to a CDMA/WCDMA HIM 455 via SDIO.

The CDMA/WCDMA HIM 455 determine the type of CDMA/WCDMA network data signal received via the LTE processor based on information in the HIM packet, and is able to determine to which module the corresponding packet is to be delivered. On the contrary, in the case of transmitting the network data signal to the LTE processor side, the CDMA/WCDMA HIM 455 converts the data signal to an HIM packet to enable LTE HIM 403 to determine the type of data and then the HIM packet is transmitted.

Various configuration modules in the CDMA/WCDMA function and control block 456 may include a platform dependency layer and may deliver CDMA/WCDMA data signals to CDMA/WCDMA protocol stack 456. In this case, the platform dependency layer indicates an API and module based on a unique platform provided by a chip manufacturer of CDMA or WCDMA. Also, a path within the platform dependency layer may differ according to the chip manufacturer. According to one embodiment, CDMA/WCDMA data signals are delivered to CDMA/WCDMA protocol stack 456 via an RM net (which is a platform dependency layer) and SIO I/F layer.

Meanwhile, in a path 550 of the LTE network data signal, like path 500 of the CDMA/WCDMA network data signal, a USB module 401 of the LTE processor communicates with the PC side. The LTE HIM 403 delivers the LTE network data signal to the LTE function block 404. The LTE function block 404 then delivers it to an LTE protocol stack 406.

Figure 6:
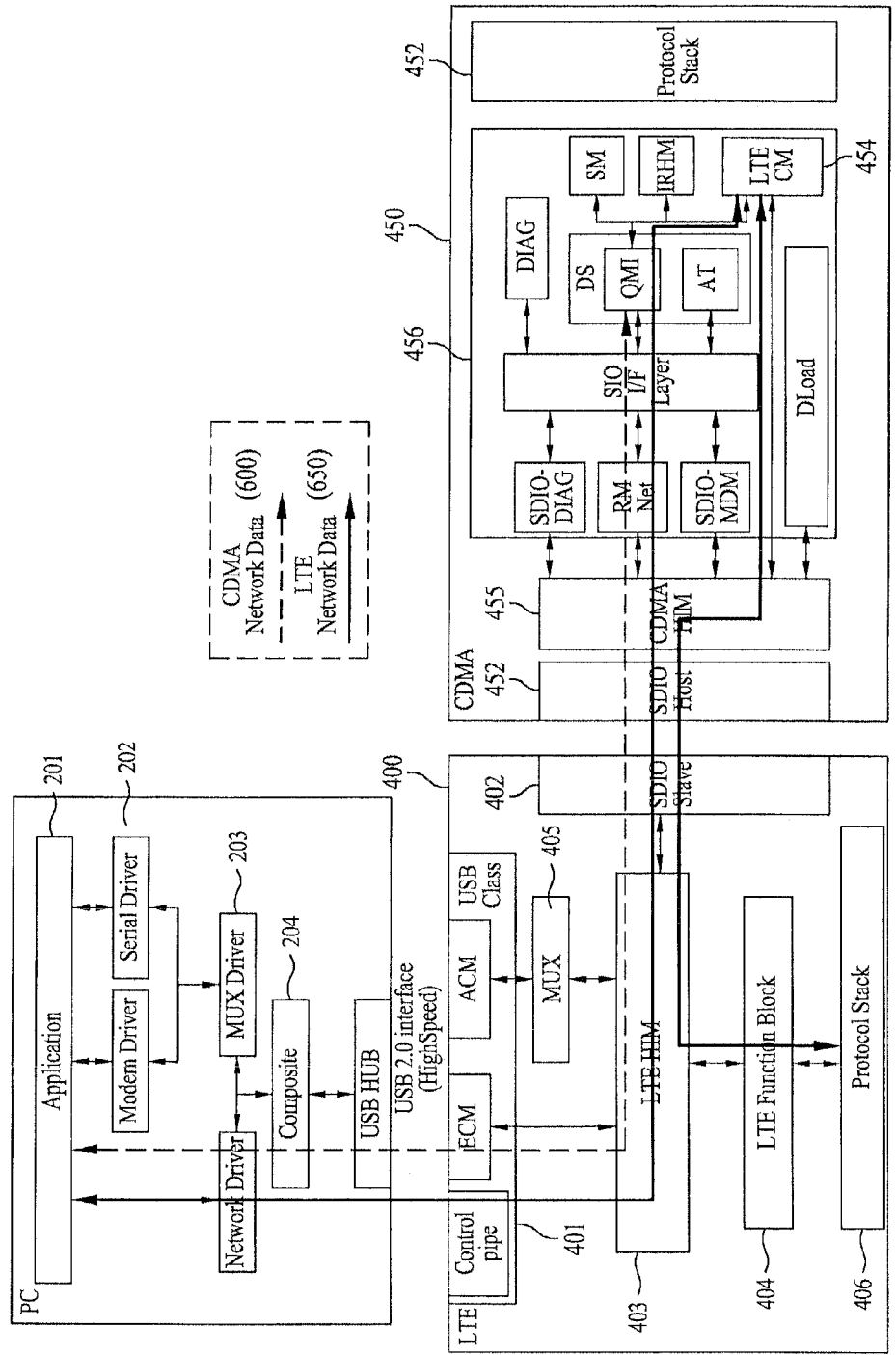
FIG. 6 is a diagram showing other communication paths that may be used for carrying CDMA/WCDMA network data signals and LTE network data signals between the dual modem device and PC system.

FIG. 6 shows another arrangement of communication paths for CDMA/WCDMA network data signals and LTE network data signals between a dual modem device and a PC. In this arrangement, in a path 600 of a CDMA/WCDMA network control signal, like the CDMA/WCDMA network data signal, SUB module 401 of an LTE processor communicates with a PC side. LTE HIM 403 converts CDMA/WCDMA network control signal to HIM packet and then delivers it to a CDMA/WCDMA HIM 455 via SDIO 402 and 451. The CDMA/WCDMA HIM 455 determines a type of the CDMA/WCDMA network control signal using information included in the HIM packet and then decides a path.

More specifically, CDMA/WCDMA HIM 455 controls the CDMA/WCDMA network control signal to be delivered to a QMI module via RM net and SIO I/F layer of a CDMA/WCDMA function and control block 456. As mentioned in the foregoing description, a platform dependency layer in the CDMA/WCDMA function and control block 456 may have a different path within the platform dependency layer according to a chip manufacturer.

Meanwhile, unlike the former path 550 of the LTE network data signal, a path of LTE network control signal is configured as follows. First, an LTE HIM 403 of the LTE processor may convert the LTE network control signal to one or more HIM packets and then delivers them to CDMA/WCDMA HIM 455 via SDIO 402 and 451.

Moreover, the CDMA/WCDMA HIM 455 delivers the LTE network control signal to an LTE CM, which is an LTE control block 454. In FIG. 6, the LTE CM is shown as being included in the CDMA/WCDMA function and control block 456. In other embodiments, the LTE CM and CDMA/WCDMA function and control block 456 may be separately provided.

Moreover, LTE CM 454 may deliver the LTE network control signal to LTE function block 404 via CDMA/WCDMA HIM 455, SDIO 402 and 451 and LTE HIM 403. The LTE function block 404 may then deliver the signal to LTE protocol stack 406 to perform network-related control of the LTE processor.

Figure 7:
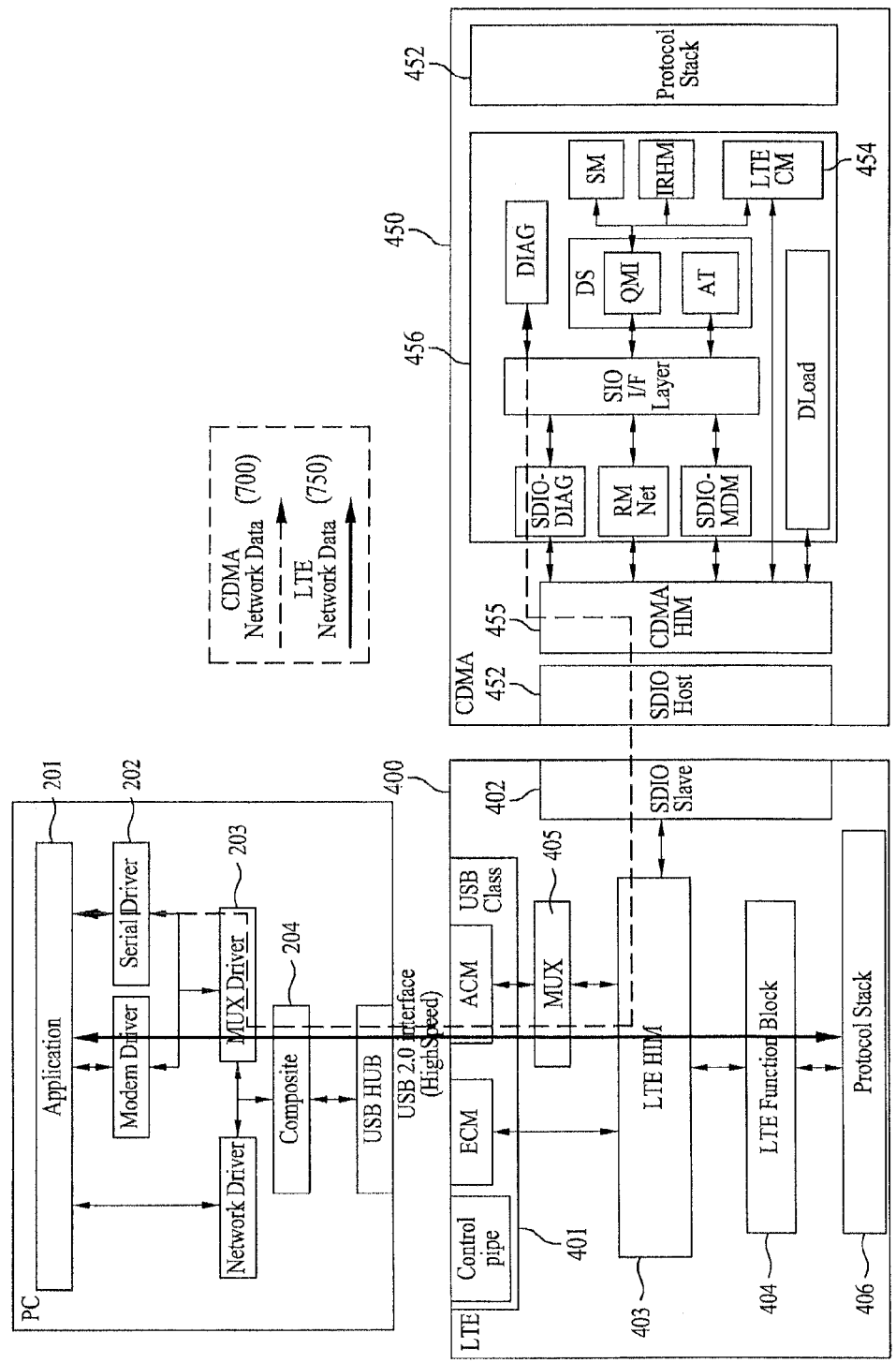
FIG. 7 is a diagram showing other communication paths that may be used for carrying CDMA/WCDMA DM data signals and LEE DM data signals between the dual modem device and PC system.

FIG. 7 shows another arrangement of communication paths for carrying CDMA/WCDMA DM data signals and LTE DM data signals between a dual modem device and a PC. Like in FIG. 3, in FIG. 7 it is assumed that a dual modem device supports one network interface and one modem/serial interface. Therefore, signals input/output to/from a modem driver and a serial driver in a PC side are multiplexed or demultiplexed by multiplexing/demultiplexing driver layer 203.

In FIG. 7, a communication 700 of CDMA/WCDMA DM data signal is configured as follows. First, the CDMA/WCDMA DM data signal is multiplexed with a different modem driver signal or a different serial driver signal by multiplexing/demultiplexing driver layer 203 and communicates with a USB module 401 of an LTE processor. The CDMA/WCDMA DM data signal is demultiplexed by a multiplexing/demultiplexing module of the LTE processor and is then delivered to an LTE HIM 403.

The LTE HIM converts the CDMA/WCDMA DM data signal to HIM packet and then delivers it to a CDMA/WCDMA HIM 455 via SDIO 402 and 451. The CDMA/WCDMA HIM 455 controls the HIM packet to be delivered to a DIAG module via SDIO and SIO/IF layer of a CDMA/WCDMA function and control block 456 using information included in the HIM packet. As mentioned, in the foregoing description, a platform dependency layer included in the CDMA/WCDMA function and control block 456 may have a different path within the platform dependency layer according to a chip manufacturer.

A path 750 of LTE DM data signal may be explained as follows. First, the LTE DM data signal is multiplexed with a different modem driver signal or a different serial driver signal by multiplexing/demultiplexing driver layer 203 and communicates with a USB module 401 of an LTE processor. The LTE DM data signal is demultiplexed by a multiplexing/demultiplexing module of the LTE processor and is then delivered to LTE HIM 403.

The LTE HIM delivers the LTE network data signal to an LTE function block. More specifically, the LTE HIM may deliver the LTE network data signal to a module performing a same or similar function of a DIAG module of CDMA/WCDMA function and control block 456 so that the LTE processor can process the LTE DM data signal.

Figure 8:
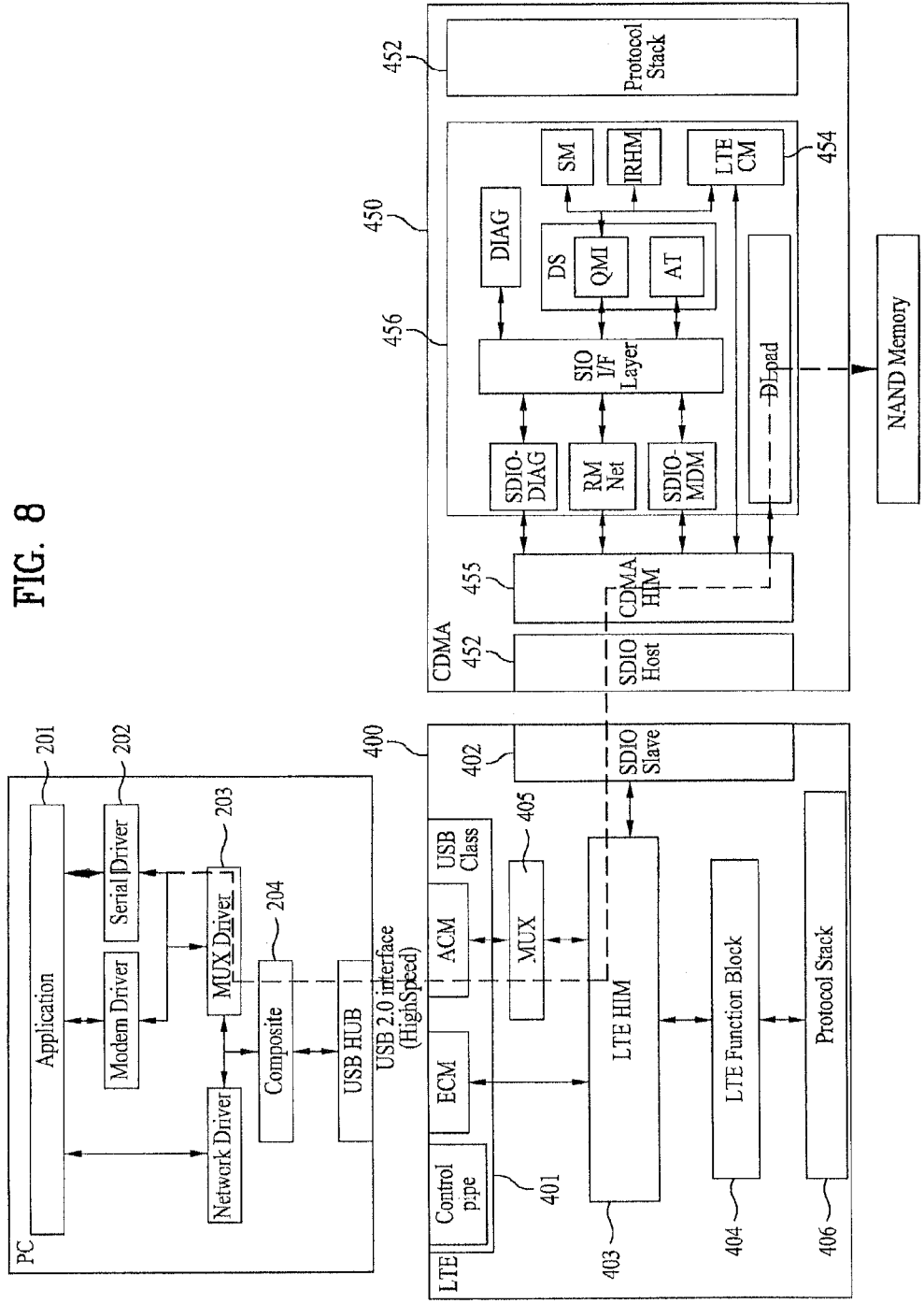
FIG. 8 is a diagram showing a communication path that may be used to perform an image data download between the dual modem device and a PC system.

FIG. 8 shows a communication path that may be used to perform image data download between a dual modem device and a PC. In this embodiment, the image data may include software for driving a processor or another type of data. The image data may be stored in a storage medium and then loaded, for example, during booting.

For example, as shown in FIG. 8, a NAND-type flash memory may be used as the storage medium. In other embodiments, the storage medium may include a non-volatile memory of any type. Also, although FIG. 8 shows a case where a NAND flash memory is connected to CDMA/WCDMA processor 450, the NAND flash memory may be provided in LTE processor 400 or each of CDMA/WCDMA and LTE processors 450 and 400.

In FIG. 8, unlike previous embodiments, a communication path of an LTE image data signal may be similar to that of a CDMA/WCDMA image data signal. More specifically, an image data signal is multiplexed with a different modem driver signal or a different serial driver signal using multiplexing/demultiplexing driver layer 203, the multiplexed signal is communicated to USB module 401 of the LTE processor, and then the image data signal is demultiplexed by a multiplexing/demultiplexing module of the LTE processor and delivered to an LTE HIM 403.

The LTE HIM converts the image data signal to an HIM packet and delivers the HIM packet to a CDMA/WCDMA HIM 455. The CDMA/WCDMA HIM controls the HIM packet to be delivered to a DLoad module of a CDMA/WCDMA function and control block 456 using information included in the HIM packet. The DLoad module is able to store the image data in a memory such as, for example, a NAND-type flash memory.

More specifically, the LTE image data and CDMA/WCDMA image data are both downloaded to the NAND-type flash memory of CDMA/WCDMA processor 450. In this case, if the CDMA/WCDMA processor can be implemented to transmit the LTE image data to LTE processor 400 on booting, the LTE processor can be booted up as well.

One or more embodiments described herein are therefore directed to a dual modem device and controlling method thereof.

In accordance with one embodiment, a dual modem device includes a first processor configured to communicate with a first communication network and a second processor configured to communicate with a second communication network, wherein the first processor comprises a USB module configured to transceive a signal with a PC (personal computer) side using a USB (universal serial bus) interface, a first packet control block determining a type of the signal transceived via the USB module and deciding a communication path, and a first function block configured to process a signal associated with the first communication network and wherein the second processor comprises a first control block configured to process a control signal for the first processor, a second control block configured to process a control signal for the second processor, and a second function block configured to process a signal associated with the second communication network.

If a first processor control signal is received from the PC side, the packet control block delivers the first processor control signal to the first control block of the second processor and the first control block delivers the first processor control signal to the first function block of the first processor.

If a first processor data signal is received from the PC side, the packet control block delivers the first processor data signal to the first function block.

If a second processor control signal or a second processor data signal is received from the PC side, the packet control block delivers the second processor control signal or the second processor data signal to the second control block of the second processor and the second control block delivers the second processor control signal or the second processor data signal to the second function block of the second processor.

The dual modem device may further include a hardware interface configured to connect the first processor and the second processor to each other.

The second processor may further include a second packet control block configured to determine a type of a signal delivered from the first processor and decide a communication path.

The first communication network may be an LTE (long term evolution) communication network and the second communication network may be a CDMA (code divisional multiple access) or WCDMA (wideband code divisional multiple access) communication network. In other embodiments, different types of networks may be used.

The dual modem device further includes a storage module configure to store data downloaded from the first communication network or the second communication network. In this case, the storage module is connected to the second processor.

In accordance with another embodiment, a communication system includes a dual modem device including a first processor configured to transceive a signal with a first communication network and a second processor configured to transceive a signal with a second communication network and a PC (personal computer) communicating with the first communication network or the second communication network using the dual modem device, wherein the first processor comprises a USB module configured to transceive a signal with the PC using a USB (universal serial bus) interface, a first packet control block determining a type of the signal transceived via the USB module and deciding a communication path, and a first function block configured to process a signal associated with the first communication network.

The second processor comprises a first control block configured to process a control signal for the first processor, a second control block configured to process a control signal for the second processor, and a second function block configured to process a signal associated with the second communication network, and wherein the PC transceives a signal corresponding to the first processor and a signal corresponding to the second processor with the dual modem device.

If a first processor control signal is received from the PC side, the packet control block delivers the first processor control signal to the first control block of the second processor and the first control block delivers the first processor control signal to the first function block of the first processor.

If a first processor data signal is received from the PC side, the packet control block delivers the first processor data signal to the first function block.

If a second processor control signal or a second processor data signal is received from the PC side, the packet control block delivers the second processor control signal or the second processor data signal to the second control block of the second processor and the second control block delivers the second processor control signal or the second processor data signal to the second function block of the second processor.

The dual modem device may further include a hardware interface configured to connect the first processor and the second processor to each other.

The second processor may further include a second packet control block configured to determine a type of a signal delivered from the first processor and decide a communication path.

The first communication network may be an LTE (long term evolution) communication network and the second communication network may be a CDMA (code divisional multiple access) or WCDMA (wideband code divisional multiple access) communication network.

The dual modem device may further include a storage module configure to store data downloaded from the first communication network or the second communication network and the storage module is connected to the second processor.

In accordance with another embodiment, a computer-readable recording medium, on which a computer program for controlling a device including at least one modem and a PC (personal computer) to communicate with each other is recorded, includes an application layer configured to control applications supported by the device, a USB driver layer including USB (universal serial bus) drivers required for driving the applications, respectively, the USB driver activating at least one of the corresponding USB drivers according to a request made by the application layer, and a multiplexing/demultiplexing driver layer configured to multiplex or demultiplex the activated at least one USB driver according to the number of interfaces supported by the device. The computer program may include code sections for implementing each of the layers.

The device may include a first processor configured to communicate with a first communication network and a second processor configured to communicate with a second communication network and the USB driver layer includes a network driver for a network control function of the device, at least one first processor driver for controlling the first processor, and at least one second processor driver for controlling the second processor.

If the number of the interfaces supported by the device is smaller than the number of the activated USB drivers, the multiplexing/demultiplexing driver layer multiplexes the activated drivers amounting to the number equal to or smaller than the number of the interfaces supported by the device.

One or more embodiments described herein may therefore provide the following effects and/or advantages. First, a dual modem terminal need not include a USB module for each processor to be connected to a PC as is the case with other types of terminals. Second, because USB modules are unnecessary for the processors, power consumption may be reduced. Third, a software routing structure may be enabled, thereby lowering manufacturing costs.

The aforementioned embodiments may be based on an assumption that a mobile communication system includes 3GPP LTE system. In other embodiments, the embodiments may be applied to types of mobile communication systems different from 3GPP LTE systems.

Also, the word "terminal" may be understood to cover mobile or fixed user devices, e.g., including but not limited to a user equipment (UE), a mobile station (MS), a mobile subscriber station (MSS) or the like. The term "base station" may be understood to cover various types of nodes of a network stage that communicates with a terminal or device as a node B, eNode B, a base station and/or the like.

Also, one or more embodiments described herein cover data transmission/reception relations between a base station and a terminal. While one or more specific operations may be explained as being performed by a base station, it is understood that those operations may also be performed by an upper node of the base station in some cases.

In particular, in a network constructed with a plurality of network nodes including a base station, operations performed for communication with a terminal can be performed by a base station or networks or network elements other than a base station. Additionally, the term "base station" may be understood to cover any type of fixed station, a Node B, an eNode B (eNB), an access point and the like.

Moreover, the embodiments described herein may be implemented in various ways. For example, one or more embodiments described herein can be implemented using hardware, firmware, software and/or any combinations thereof.

In a hardware implementation, a method corresponding to each embodiment can be implemented by one or more ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In a firmware or software implementation, one or more embodiments described herein can be implemented by one or more modules, procedures, and/or functions for performing the above-explained functions or operations. Software code may be stored in a memory unit and is then driven by a processor. The memory unit may be provided within or outside the processor to exchange data with the processor through the various means known in public.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dual modem device comprising:
   a first processor to communicate with a first wireless network; and
   a second processor to communicate with a second wireless network,
   wherein the first processor includes:
      a USB module to transceive a signal with a computer side using a universal serial bus (USB) interface,
      a first packet control block to determine a type of the signal received via the USB module, based on whether the signal is a data signal or a control signal, to determine a network currently connected to the dual modem device and to determine a communication path based on the determined type of the signal and the determined currently connected network, and
      a first function block to process a signal associated with the first wireless network,
   wherein the second processor includes:
      a first control block to process a control signal for the first processor,
      a second control block to process a control signal for the second processor, and
      a second function block to process a signal associated with the second wireless network,
   wherein when the currently connected network is the first wireless network, the first packet control block determines:
      a data signal communication path as connecting through the first packet control block and the first function block, and
      a control signal communication path as connecting through in an order of the first packet control block, the first control block and the first function block, and
   wherein when the currently connected network is the second wireless network, the first packet control block determines:
      both a data and a control signal communication path as connecting through in an order of the first packet control block, the second control block and the second function block.

2. The device of claim 1, further comprising:
   a hardware interface to couple the first and second processors.

3. The device of claim 1, wherein the second processor further includes:
   a second packet control block to determine a type of a signal delivered from the first processor and decide a communication path.

4. The device of claim 1, wherein:
   the first wireless network is a long term evolution (LTE) communication network, and
   the second wireless network is a code divisional multiple access (CDMA) or a wideband code divisional multiple access (WCDMA) communication network.

5. The device of claim 1, further comprising:
   a storage module to store data downloaded from the first wireless network or the second wireless network, wherein the storage module is coupled to the second processor.

6. The device of claim 1, wherein the computer side includes a personal computer.

7. The device of claim 1, wherein the first packet control block determines the network currently connected to the dual modem device based on a HIM packet of the received signal.

8. The device of claim 1, wherein the USB module supports at least one interface supported by a USB of the second processor.

9. A communication system comprising:
   a dual modem device including a first processor to transceive a signal with a first wireless network and a second processor to transceive a signal with a second wireless network; and
   a computer to communicate with the first wireless network or the second wireless network using the dual modem device,
   wherein the first processor includes a USB module to transceive a signal with the computer using a Universal serial bus (USB) interface, a first packet control block to determine a type of the signal received via the USB module to be a data signal or a control signal, to determine a network currently connected to the dual modem device and to determine a communication path based on the type of the signal and the currently connected network, and a first function block to process a signal associated with the first wireless network,
   wherein the second processor includes a first control block to process a control signal for the first processor, a second control block to process a control signal for the second processor, and a second function block to process a signal associated with the second wireless network, and
   wherein the computer transceives a signal corresponding to the first processor and a signal corresponding to the second processor with the dual modem device, wherein when the currently connected network is the first wireless network, the first packet control block determines:
- a data signal communication path as connecting through the first packet control block and the first function block, and
- a control signal communication path as connecting through in an order of the first packet control block, the first control block and the first function block, and wherein when the currently connected network is the second wireless network, the first packet control block determines:
- both a data and a control signal communication path as connecting through in an order of the first packet control block, the second control block and the second function block.

10. The communication system of claim 9, wherein the dual modem device further includes a hardware interface to couple the first and second processors.

11. The communication system of claim 9, wherein the second processor further includes a second packet control block to determine a type of a signal delivered from the first processor and to decide a communication path.

12. The communication system of claim 9, wherein the first wireless network includes a long term evolution (LTE) communication network, and wherein the second wireless network is a code divisional multiple access (CDMA) or a wideband code divisional multiple access (WCDMA) communication network.

13. The communication system of claim 9, wherein the dual modem device comprises a storage module to store data downloaded from the first wireless network or the second wireless network, and wherein the storage module is coupled to the second processor.

14. The communication system of claim 9, wherein the computer side includes a personal computer.

15. The communication system of claim 9, wherein the first packet control block determines the network currently connected to the dual modem device based on an HIM packet of the received signal.

16. The communication system of claim 9, wherein the USB module supports at least one interface supported by a USB of the second processor.

* * * * *